United States Patent [19]

Lukianov

[11] Patent Number: 5,286,052
[45] Date of Patent: Feb. 15, 1994

[54] VEHICLE SUSPENSION WITH FLOATING UPPER ARM

[75] Inventor: Eugene R. Lukianov, Birmingham, Mich.

[73] Assignee: Chrysler Corporation, Highland Park, Mich.

[21] Appl. No.: 980,059

[22] Filed: Nov. 23, 1992

[51] Int. Cl.$^5$ .............................................. B60G 3/26
[52] U.S. Cl. .................................... 280/675; 280/691; 280/693
[58] Field of Search ............... 280/661, 663, 666, 673, 280/675, 691, 693, 696, 698, 701

[56] References Cited

U.S. PATENT DOCUMENTS

| | | | |
|---|---|---|---|
| 2,162,828 | 6/1939 | Slack | 280/661 |
| 2,767,998 | 10/1986 | Powell | 280/96.2 |
| 3,630,303 | 12/1971 | Froumajou | 280/666 X |
| 3,680,881 | 8/1972 | Douglas | 280/96.2 R |
| 3,711,113 | 1/1973 | Stammreich | 280/96.2 R |
| 4,236,728 | 12/1980 | Policy et al. | 280/661 |
| 4,440,419 | 4/1984 | Kosak et al. | 280/661 |
| 4,700,972 | 10/1987 | Young | 280/707 |
| 4,753,455 | 6/1988 | Murakami et al. | 280/675 X |
| 4,842,297 | 6/1987 | Takahashi | 280/675 |
| 4,911,466 | 3/1990 | Blair | 280/668 |
| 4,927,169 | 5/1990 | Scaduto | 280/661 |
| 4,973,076 | 11/1990 | Fayard | 280/661 |

FOREIGN PATENT DOCUMENTS

| | | | |
|---|---|---|---|
| 0437255 | 7/1991 | European Pat. Off. | 280/675 |
| 0056214 | 3/1989 | Japan | 280/673 |
| 0056216 | 3/1989 | Japan | 280/673 |
| 3-186410 | 8/1991 | Japan | 280/673 |

Primary Examiner—Margaret A. Focarino
Assistant Examiner—Peter English
Attorney, Agent, or Firm—Edward P. Barthel

[57] ABSTRACT

A double wishbone suspension system for a motor vehicle which achieves reduced roll center movement and wheel camber change relative to the vehicle body in jounce and rebound of the vehicle wheels throughout their suspension travel while requiring minimal packaging space. The system comprises upper and lower inwardly bifurcated control arms wherein each arm has an outer apex connected by a ball joint to a wheel carrier. The lower arm forked portions have the inner ends thereof pivotally connected to a lower pivot pin supported by a body bracket. The upper arm forked portions have the inner ends thereof pivotally connected to a floating upper pivot pin. A pair of first upstanding links each have their lower end pivotally connected at an intermediate point of an associated lower arm forked portion and an upper end pivotally connected to the upper floating pivot pin. A pair of second laterally projecting links each have an inboard end pivotally connected to the floating pivot pin and an outboard end pivotally connected to the bracket.

3 Claims, 2 Drawing Sheets

VEHICLE SUSPENSION WITH FLOATING UPPER ARM

BACKGROUND OF THE INVENTION

This invention relates to vehicle suspension systems and more particularly to a suspension system with a double floating upper arm arrangement for off-road vehicles which provides a reduction in roll center movement in jounce and rebound over existing suspension systems.

The U.S. Pat. No. 4,842,297 issued Jun. 27, 1989 to Mitsuo Takahashi discloses a wishbone suspension system for a motor vehicle comprised of upper and lower suspension arms each having one end pin-connected to the body of the vehicle and a knuckle member operatively connected to an axle of a wheel. The Takahashi suspension further comprises a connecting rod having one end connected to an intermediate part of one of the suspension arms and a bell crank lever having a first end pin-connected to the other end of the connecting rod, a second end pin-connected to one end of the knuckle member, and a bent portion between these first and second ends. The bent portion is pin-connected to the other end of the suspension arms such that the system is capable of reducing the camber variation characteristics relative to the body of the vehicle.

The U.S. Pat. No. 4,927,169 issued May 22, 1990 to Onofrio Scaduto discloses an automobile suspension system having linkage and geometry for compensating for roll and dip of the chassis during cornering for maintaining a substantially zero camber of the vehicle wheels relative to the ground during roll of the vehicle chassis. The Scaduto suspension system comprises upper and lower control members pivotally mounted to a wheel assembly and a vehicle chassis with one of the upper and lower control members being connected to the chassis by means of a movable pivot that enables shifting of the control member for compensating for chassis roll for maintaining zero camber of the vehicle wheels.

SUMMARY OF THE INVENTION

It is an object of the present invention to provide a suspension system including upper and lower wishbone control arms for a vehicle such that during off-road use wheel camber change during suspension travel is optimized throughout the tire travel to maintain an optimal tire to ground angle and to maintain optimal tire contact to the ground during such off-road use.

It is another object of the present invention to provide a vehicle suspension system as set forth above wherein the wheel camber angle in rebound of the tire is reversed and is subtractive to the angle due to suspension travel so that more of the wheel drive half-shaft constant velocity joint angle can be used for suspension travel and steering angle.

It is another object of the present invention to provide a vehicle suspension system as set forth above wherein wheel suspension travel is not limited by the upper control arm approaching a straight line orientation to the wheel steering knuckle in rebound thereby obviating an absolute limit to suspension travel.

It is another object of the present invention to provide a vehicle suspension system, as set forth above, wherein a short upper control arm is bifurcated inwardly. The upper arm has an outer apex connected by a ball joint coupling to an upper portion of a wheel carrier and a pair of forked portions with the inner ends thereof pivotally connected to a floating pivot pin producing, in effect, an extended upper control arm.

It is still another object of the present invention to provide a vehicle suspension system as set forth above wherein a long lower control arm is bifurcated inwardly having an outer apex connected by a ball joint coupling to a lower portion of the wheel carrier and a pair of forked portions with the inner ends thereof pivotally connected to a lower pivot pin supported by a body bracket. The upper floating pivot pin is supported by means of first and second pairs of links. The first pair of links are arranged such that each lower end thereof is pivotally connected to an associated lower arm forked portion intermediate its outer apex and the lower pivot pin while each upper end is pivotally connected to the floating pivot pin. The second pair of links are arranged such that each inboard end thereof is pivotally connected to the floating pivot pin and the outboard end thereof are pivotally connected to the body bracket upper pivot pin. The bracket member comprises fore and aft generally gooseneck-shaped bracket halves with each bracket half including an upstanding elongated neck portion terminating at its upper end in an outwardly extending hook-like head portion. Each hook-like head portion terminates in a downwardly projecting finger having its free distal end supporting one end of the upper fixed pivot pin. Thus, each second link has its outboard end connected to the upper pivot pin which is positioned a predetermined distance closer to the upper control arm outer apex than the floating pivot pin.

The upper control arm describes an oval/elliptical arc around its upper fixed pivot pin in counter-distinction to a circular arc of a conventional upper swing arm. As a result suspension travel of the wheel is not limited by the upper control arm approaching a straight line orientation relative to the wheel carrier in rebound. The present suspension arrangement achieves a reduction in roll center movement in jounce and rebound compared to conventional short/long arm suspensions. Further, applicant's suspension arrangement reduces wheel camber angle variations relative to the vehicle body with suspension jounce and rebound travel.

BRIEF DESCRIPTION OF THE DRAWING

Other objects, features, and advantages of the present invention will become apparent to those skilled in the vehicle suspension art, and are readily apparent from the following detailed description of the best mode taken in conjunction with the accompanying drawings in which.

DETAILED DESCRIPTION OF THE INVENTION

Figure 1:
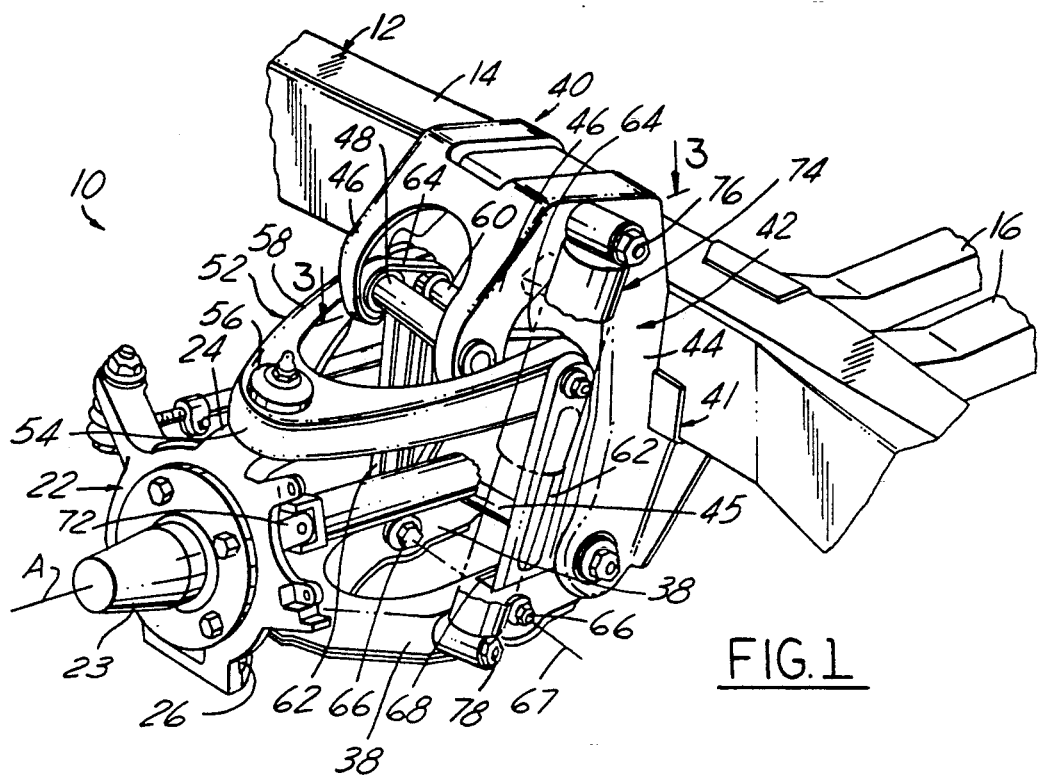
FIG. 1 is a fragmentary perspective view of an improved vehicle double wish-bone suspension system according to this invention.

Referring now to the drawings, FIG. 1 illustrates a fragmentary perspective view of a vehicle frame and front wheel suspension system 10 mounted to a vehicle body front frame structure, generally indicated at 12. The frame includes laterally spaced a longitudinally extending left and right box section sill frame members with only the left sill frame member 14 being shown. The frame sill members are suitably interconnected by frame cross members such as the pair of transversely extending cross members 16. Left and right, ground engaging steerable wheels support the frame structure 12 with only the left steerable wheel being shown at 20 in FIG. 2.

Figure 5:
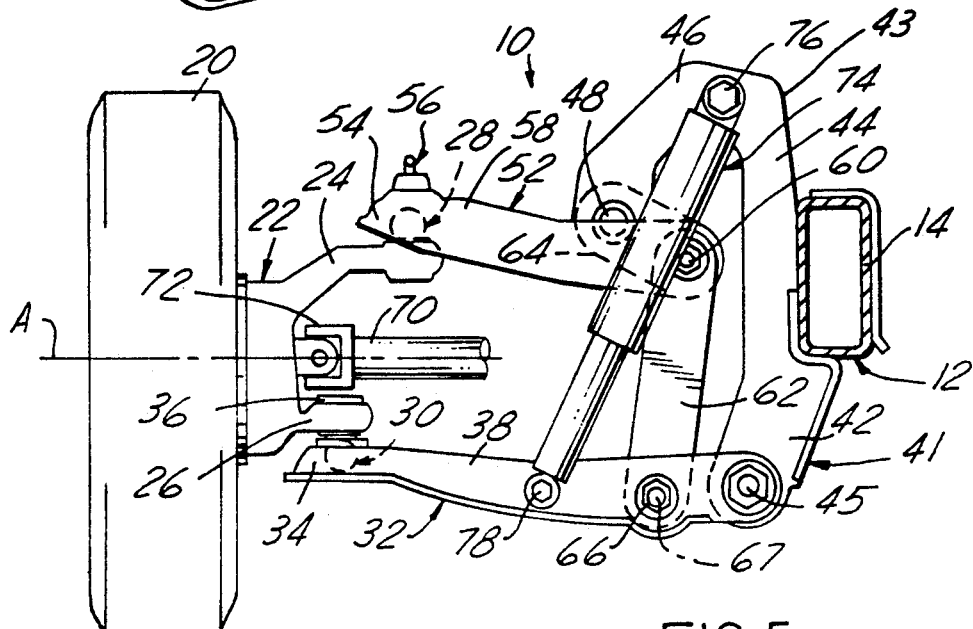
FIG. 5 is a view similar to FIG. 2 showing the suspension system in its neutral or curb mode.

Conventional wheel axle assemblies 23 (FIG. 1) associated with each of the front wheels are provided for carrying the wheels. Each wheel assembly comprises a steerable fork or wheel carrier 22 having vertically spaced, upper 24 and lower 26 control arm supports. The control arm supports extend inboard from the left wheel carrier 20 and are shown spaced on opposite sides of wheel rotational axis indicated at "A" in FIGS. 1 and 5. As best seen in FIG. 5, each of the upper and lower control arm supports 24 and 26 respectively, has a ball shaped coupling element 28 and 30, respectively, to provide a ball-joint mounting of the suspension system.

A lower transversely extending long wishbone type swing or control arm 32 is bifurcated inwardly having a lower outer apex 34 thereof connected with the lower arm support 26 by lower ball joint 36. FIG. 1 depicts the lower control arm 32 comprising fore and aft forked arm portions 38-38, respectively, with the inboard free ends thereof pivotally connected to a bracket member 40.

Figure 3:
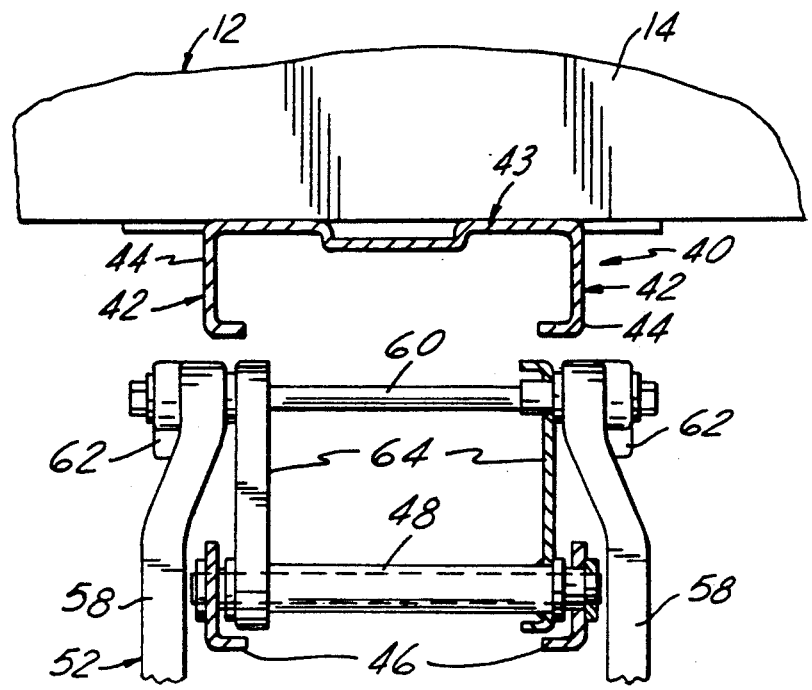
FIG. 3 is a fragmentary top elevational view of the suspension system shown in FIG. 2.

The bracket member 40, suitably affixed to an outer wall of the frame member 14 by welding to a Z-shaped sheet metal gusset 41, includes a pair of longitudinally spaced fore and aft gooseneck-shaped mirror image bracket halves 42-42 extending transversely from an interconnecting bight wall 43 (FIG. 3). Each bracket half 42 comprises an inboard upstanding elongated neck portion 44-44 with the lower ends thereof each pivotally connected by a longitudinal lower pivot pin 45 to an associated inboard end of a lower forked portion 38. It will be noted in the disclosed arrangement of FIG. 5 that the lower pivot pin 45 is located at a height substantially equal to the height of the wheel carrier lower support member 26. It will be appreciated, however, that while the lower pivot pin 45 is shown located slightly below the support member 26, it may be located slightly above the support member 26 without departing from the spirit of the invention.

Figure 2:
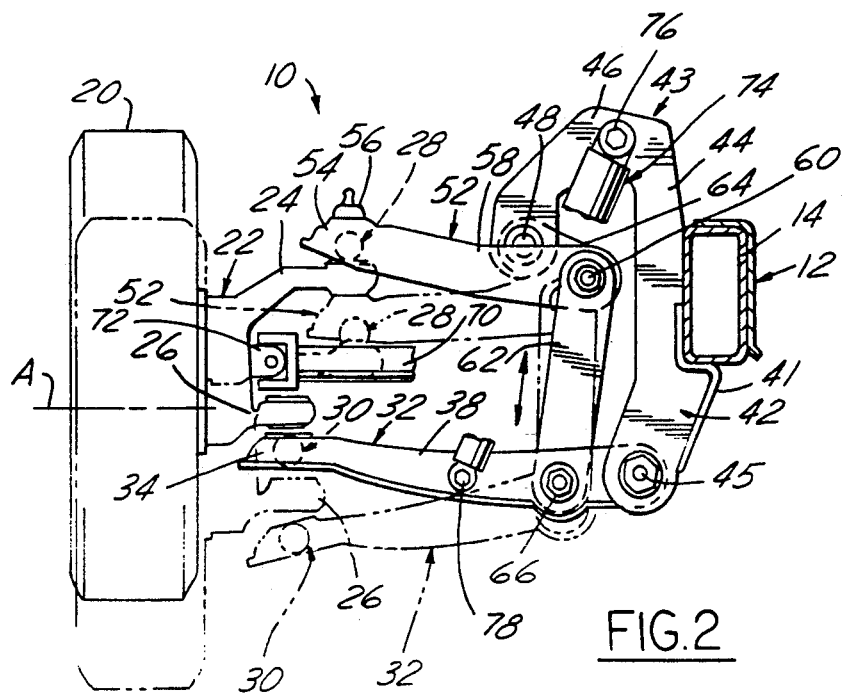
FIG. 2 is a fragmentary frontal plan view of a portion of the suspension system shown in FIG. 1.

As best seen in FIG. 2, the fore and aft gooseneck-shaped bracket halve neck portions 44-44 each terminate at its upper end portion in fore and aft outwardly extending hook-like head portions 46-46. FIG. 1 shows each head portion 46 with its downwardly projecting free distal end supporting one end of an upper longitudinally extending pivot pin 48. It will be noted in FIG. 5 that the upper pivot pin 48, parallel to the lower pivot pin 46, is located at a height substantially equal to the height of the wheel carrier upper support member 24. In the same manner, as with the lower pivot pin 45, while the upper pivot pin 48 is shown located at a height slightly above the wheel carrier upper support member 24, its position could be slightly below the support member 24, if desired. FIG. 2 shows the upper pivot pin 48 positioned outboard of floating pivot pin 60; i.e., closer to apex 54 of the upper control arm than the floating pivot pin 60.

A transversely extending short wishbone type upper swing or control arm 52 is bifurcated inwardly from an outer apex 54 thereof connected with the wheel carrier upper arm support 24 by upper ball joint 56. FIG. 1 also depicts the upper control arm 52 comprising fore and aft forked arm portions 58-58 wherein each inboard free end thereof is pivotally connected to a longitudinally extending floating pin 60. It will be observed in FIG. 2 that the upper pivot pin 48 is positioned outboard of the floating pivot pin 60; i.e., substantially intermediate the upper control arm outboard apex and the floating pivot pin 60. The upper pivot pin 48 is closer to the upper control arm outboard apex 54 than it is to the floating pivot pin 60.

With reference to FIGS. 1 and 2, the floating pivot pin 60 is interconnected by a first pair of mirror image upstanding long links 62 and a second pair of mirror image upper short links 64. The first pair of long links 62 have their lower ends thereof pivotally connected by pivot bolts 66-66 to an intermediate point on associated lower control arm forked portions 38-38. It will be noted in FIG. 1 that the forked portions 38 are channel-shaped in longitudinal section having an upper bight portion formed with an elongated slot 68 through which each first link lower end extends prior to being connected by pivot bolts 66. The pivot bolts 66 are aligned on a common longitudinal long link lower pivot axis indicated at 67 in FIG. 1.

The first pair of links 62-62, the upper ends of which straddle the upper control arm forked portions 58-58, are pivotally connected to the free ends of the floating pivot pin 60. The second pair of short pivot links 64-64 have the inboard ends thereof pivotally connected to the floating pivot pin 60 and extend outwardly therefrom such that the outboard ends thereof are pivotally connected to the upper pivot pin 48. The upper pivot pin 48 is located closer to the apex 54 of the upper control arm by a predetermined dimension substantially equal to the length between the pivotal connections 48 and 60 of each second pivot link 64.

Figure 4:
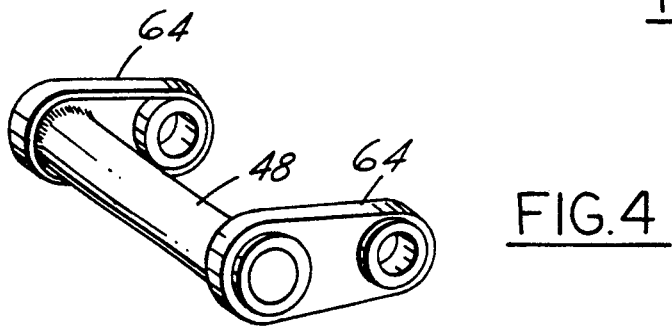
FIG. 4 is an enlarged detail perspective view of the intermediate link shown in FIGS. 1-3.

As seen in FIGS. 4 and 5, the wheel 20 and axle assembly 23 are driven by a differential gear (not shown) which is operatively connected to the wheel carrier by means of a half shaft 70. The half shaft is coupled to the differential gear at its inboard end by a constant velocity or universal joint (not shown) and coupled at its outboard end to the wheel axle assembly 23 by a universal joint schematically shown at 72.

As a further refinement, FIG. 5 shows the invention provided with a shock absorber 74 for reducing vibration of the wheel 20 in the up and down direction. The upper end of the shock absorber 74 is coupled at an upper pivot connection 76 to the bracket member head portion 46 while its lower end is coupled at its lower pivot connection 78 to a forked portion of the lower control arm intermediate its outer apex 34 and the lower pivot pin 66 of the long link 62.

It will be appreciated that applicant's unique suspension system allows variable positioning of the upper control arm floating pivot pin 60 with respect to the lower arm fixed pivot pin 45 thereby achieving a variety of suspension movements compared to a conventional double wishbone suspension. The floating upper pivot pin 60 achieves, in effect, a much longer upper control arm which is adapted to describe an oval/elliptical arc around its bracket upper pivot pin 48 as compared to a circular arc of a single pivot upper control arm. Thus, as seen in FIG. 2, the camber angle change during suspension travel is optimized throughout the tire travel thereby maintaining optimal tire contact to ground.

Although the present suspension system has been described in some detail by way of illustration and example for purposes of clarity of understanding, it will, of course, be understood that various changes and modifications may be made in the form, details, and arrangements of the parts without departing from the scope of the present invention as set forth in the following claims.

What is claimed is:

1. An independent wheel suspension and support bracket system for a motor vehicle body having a driven wheel supported on a wheel axle assembly to rotate therewith, and wherein the wheel axle assembly is operatively connected to a vehicle half shaft for driving the wheel axle assembly and wheel about a transverse rotational axis, said system comprising:

upper and lower control arms bifurcated inwardly defining upper and lower pairs of fore and aft forked portions, each said upper and lower control arm having an outer apex connected by a ball joint to respective inboard projecting upper and lower supports of a wheel carrier, each said lower forked portion having an inboard end thereof pivotally connected to a longitudinally extending lower pivot pin aligned on a common longitudinal lower pivot axis, said lower pivot pin having fore and aft ends supported by a bracket member adapted for mounting the suspension system on the vehicle body;

said wheel carrier upper and lower supports extending inboard and vertically spaced above and below the rotational axis, said wheel carrier supporting the wheel axle assembly for rotation by the drive shaft about the rotational axis;

said bracket member comprises fore and aft generally gooseneck-shaped mirror image bracket halves in transverse section longitudinally spaced a predetermined dimension on opposite fore and aft sides of the half shaft, each said bracket half providing an upstanding elongated neck portion terminating at its upper end in an outwardly extending hook-like head portion, said lower pivot pin having fore and aft ends thereof supported at a lower end of an associated fore and aft bracket neck portion;

each said bracket fore and aft head portion terminating in a downwardly projecting free distal end, a longitudinally extending upper pivot pin aligned on a common longitudinal upper pivot axis, said upper pivot pin having forward and aft ends each supported by an associated fore and aft bracket half neck portion distal end;

a pair of mirror image upstanding fore and aft first links each having a pair of upper and lower end connections spaced apart a predetermined dimension, each said first link lower end connection pivotally connected at an intermediate point on an associated lower control arm forked portion, said intermediate point spaced a predetermined lateral dimension from said lower pivot axis, each said first link upper end connection pivotally connected to an associated fore and aft end of a longitudinally extending floating pivot pin;

said upper control arm pair of forked portions each having an inboard end thereof pivotally connected to said floating pivot pin;

a pair of mirror image fore and aft second links each having a pair of inboard and outboard end connections spaced apart a predetermined dimension, each said second link inboard end connection pivotally connected to said floating pivot pin such that said second pair of links are straddled by said upper pair of control arm forked portions;

each said second link outboard end connection pivotally connected to said upper pivot pin for pivotal movement about a common longitudinal upper pivot axis positioned substantially intermediate said upper control arm outer apex and said floating pivot pin;

each said second link dimension between its end connections being substantially equal to said lateral dimension between each said first link lower end connection and its associated lower pivot axis;

said lower control arm forked portions pair of fore and aft free ends straddled by said pair of bracket half neck portion lower ends, and said pair of bracket half head portion distal ends straddled by said upper control arm pair of forked portions; and a shock absorber having an upper end thereof coupled to one of said fore and aft bracket head portions and a lower end thereof coupled to a corresponding lower control arm forked portion intermediate said lower arm outer apex and said first link lower end connection, whereby a space is provided between said pair of first links and between a lower portion of said fore and aft bracket halves enabling outboard passage of the half shaft via the space for driving connection with the wheel axle assembly.

2. The independent wheel suspension system as set forth in claim 1 wherein said pair of longitudinally spaced fore and aft gooseneck shaped bracket halves extend transversely outboard from an interconnecting bight wall.

3. The independent wheel suspension system as set forth in claim 2 wherein said bracket member bight wall is affixed to an outer frame wall of the motor vehicle body.

* * * * *